March 23, 1948.  T. C. RIEBE  2,438,454
MOUNTING ARRANGEMENT FOR ELECTRICAL EQUIPMENT
Filed Nov. 23, 1944  3 Sheets-Sheet 1
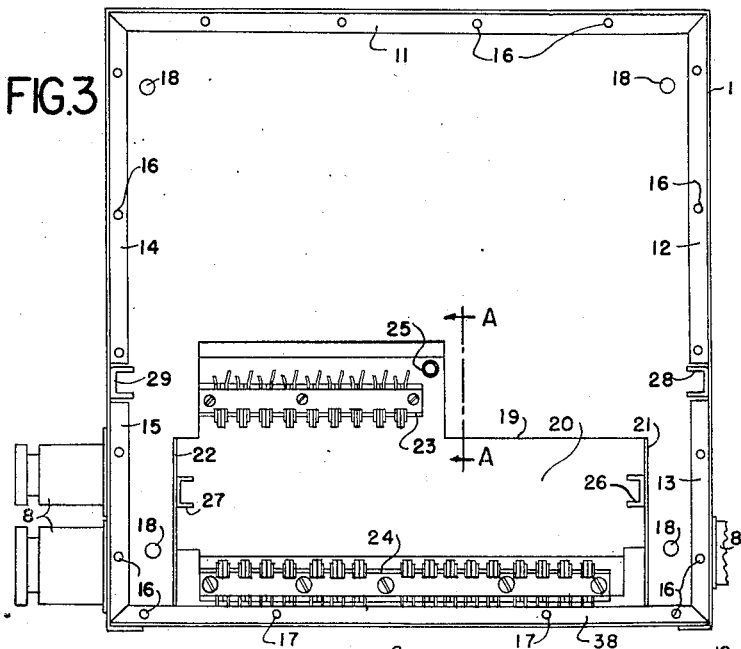
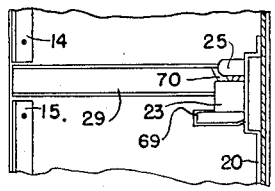
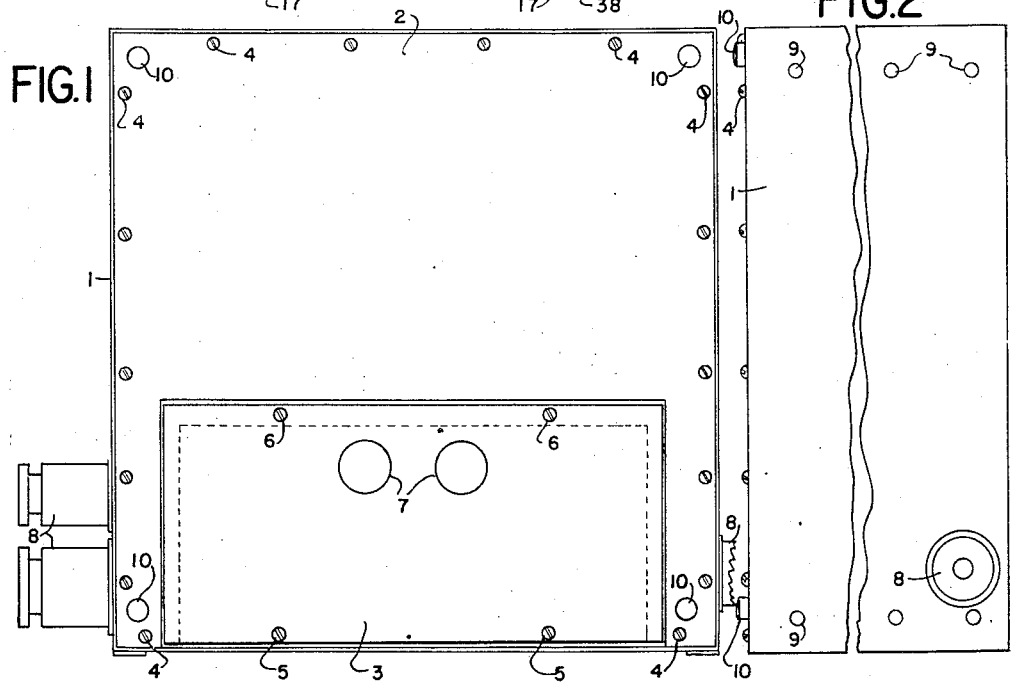
INVENTOR.
THEODORE C. RIEBE
BY *Chas. Lee Candy*
ATTORNEY March 23, 1948.  T. C. RIEBE  2,438,454
MOUNTING ARRANGEMENT FOR ELECTRICAL EQUIPMENT
Filed Nov. 23, 1944  3 Sheets-Sheet 2
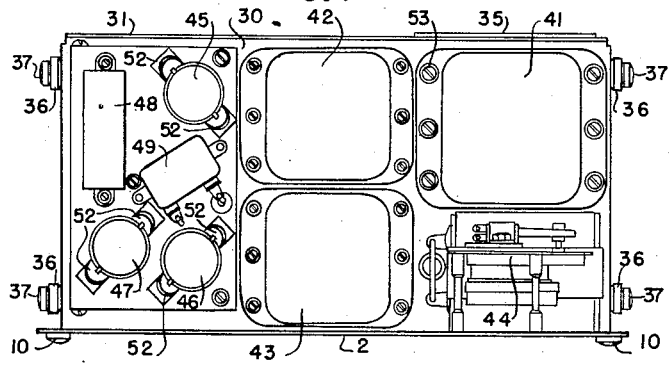
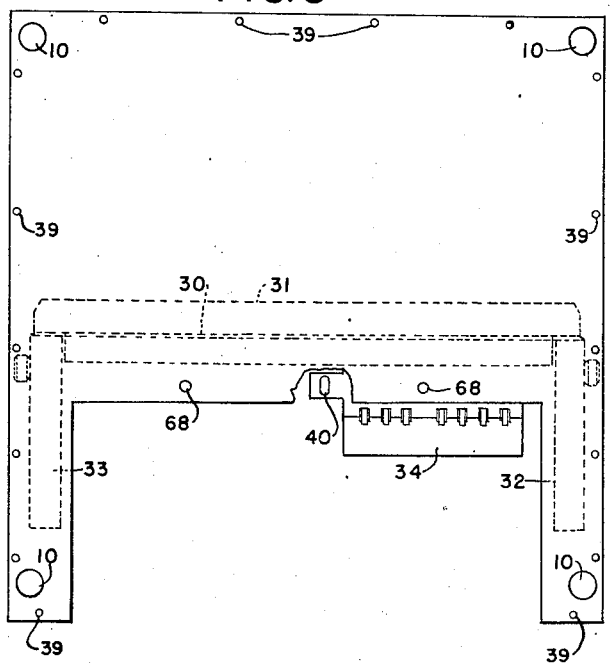
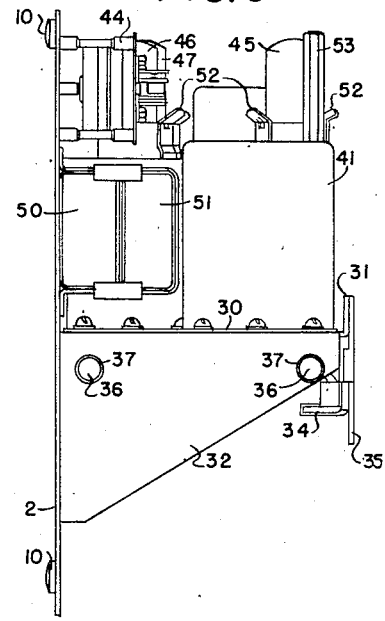
INVENTOR.
THEODORE C. RIEBE
BY
ATTORNEY March 23, 1948.  T. C. RIEBE  2,438,454
MOUNTING ARRANGEMENT FOR ELECTRICAL EQUIPMENT
Filed Nov. 23, 1944  3 Sheets-Sheet 3
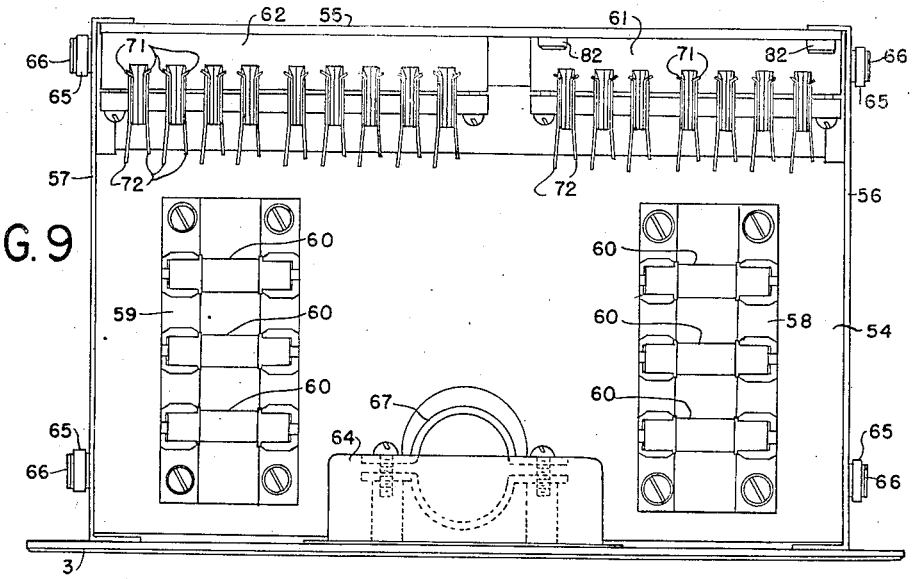
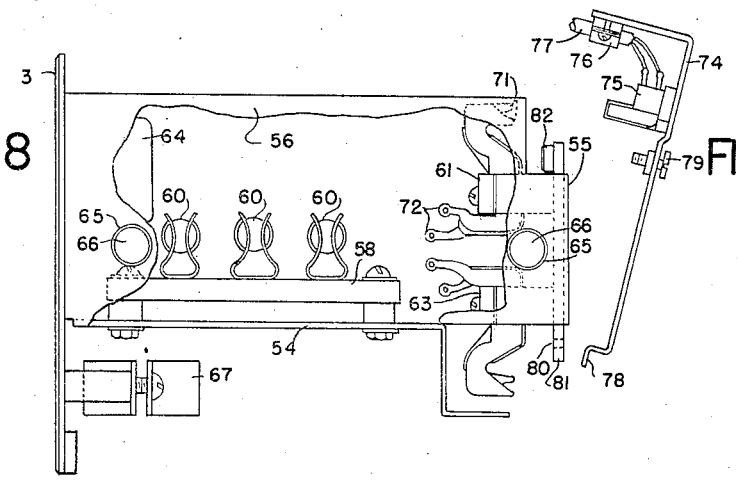
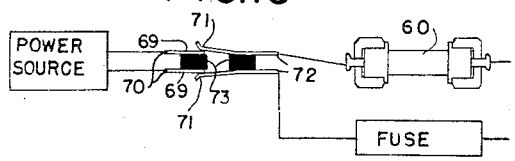
INVENTOR.
THEODORE C. RIEBE
BY
ATTORNEY Patented Mar. 23, 1948

2,438,454

UNITED STATES PATENT OFFICE 2,438,454

MOUNTING ARRANGEMENT FOR ELECTRICAL EQUIPMENT

Theodore C. Riebe, Chicago, Ill., assignor to Automatic Electric Laboratories, Inc., Chicago, Ill., a corporation of Delaware Application November 23, 1944, Serial No. 564,860

4 Claims. (Cl. 175—298)

The present invention relates in general to a mounting arrangement for electrical equipment, and more particularly to an improved cabinet having removable subunits each accommodating instrumentalities, the electrical connections between the subunits and the cabinet proper being automatically made or broken upon the insertion or removal of the corresponding unit.

The cabinet of this invention was designed especially for use on shipboard where it is subject to rough usage, vibrations and shocks. Means are provided in the cabinet for securely fastening the cabinet in place, and the removable subunits are so anchored within the cabinet that they will withstand vibrations and severe shocks without dislodgement or the interrupting of electrical connections between the subunits and the cabinet.

The principal object of the invention is to produce an improved cabinet arrangement for the mounting of electrical instrumentalities having simple and economical construction, and readily accessible for inspection and repair.

Another object of the invention is to provide a cabinet having a new and novel arrangement of subunits upon which instrumentalities may be so disposed, related and connected as to utilize the least possible space to the best advantage. Hence, the overall dimensions of the cabinet may be kept to minimum figures.

A further object of the invention is to provide simple means for automatically connecting a subunit when the subunit is inserted into the cabinet and, conversely, for automatically disconnecting the subunit when it is withdrawn from the cabinet. Thus, each subunit is electrically "dead" when withdrawn from the cabinet.

A still further object of the invention is to provide new and novel means for accurately aligning each subunit as it is inserted into the cabinet, thereby assuring that all of the connections will be easily and correctly made.

Another object of the invention is to provide simple and flexible means for temporarily extending the connections from the cabinet to a subunit when it becomes advisable to withdraw the subunit from the cabinet for the purpose of observing the operation of instrumentalities mounted on the subunit. The undesirable expedient of running temporary wires for such a purpose, together with the attendant possibilities of making wrong connections and thereby causing possible damage to the instrumentalities, is thus eliminated.

A feature of the invention resides in the fact that the cabinet and the subunits are completely enclosed. Ample protection is, therefore, afforded the instrumentalities mounted therein against weather exposure, accidental damage and unauthorized tampering.

An additional feature of the invention is directed to the use of watertight bushings for sealing wire entrances into the cabinet.

A further feature of the invention concerns the mechanical protection afforded the instrumentalities mounted on a subunit from possible damage when the subunit is withdrawn from the cabinet and placed face up, face down or endwise on a table or workbench.

Other objects and features of the invention will become apparent from the following description together with the accompanying drawings which show a proposed embodiment by way of example.

The invention is disclosed in 3 sheets of drawings comprising Figs. 1 to 11 inclusive.

Fig. 1 is a front view, in elevation, of the assembled cabinet showing the front panels of the two subunits, and the manner of fastening the panels in position.

Fig. 2 is an end view, in elevation, of the assembled cabinet taken from the right-hand end of the cabinet shown in Fig. 1.

Fig. 3 is a front view, in elevation, of the cabinet with the two subunits removed.

Fig. 4 is a partial cross section of the cabinet taken along the line A—A in Fig. 3.

Fig. 5 is a front view, in elevation, of the larger subunit.

Fig. 6 is a right-hand end view, in elevation, of the larger subunit showing further structural details of the unit.

Fig. 7 is a top view, in elevation, of the larger subunit.

Fig. 8 is a right-hand view, in elevation, of the smaller subunit.

Fig. 9 is a top view, in elevation, of the smaller subunit.

Fig. 10 shows the sliding contact arrangement of two pairs of terminals in diagrammatic form.

Fig. 11 is an end view, in elevation, of a portable terminal assembly which is utilized for temporarily connecting the upper terminals of the smaller subunit to another unit through the medium of an extension cord.

Referring now to the drawings, the complete assembly consists essentially of a cabinet having an open front and two subunits removably inserted into the cabinet, the front panels of the subunits being fastened to the cabinet as shown in Fig. 1. Each subunit is fitted with a shelf extending horizontally to the rear from the front panel, each shelf being fitted with rollers. In Figs. 6 and 7, the rollers for the larger subunit are identified by reference number 36, each roller being fastened in place by rivet 37. Similarly in Figs. 8 and 9, the rollers for the smaller subunit are identified by reference number 65.

The rollers of the shelves engage channel tracks mounted horizontally in the cabinet and guide the shelves towards the rear of the cabinet when the respective front panels are pushed towards the cabinet. Channel tracks 28 and 29 in Fig. 3 are engaged by the rollers of the larger subunit, and channel tracks 26 and 27 by the smaller subunit.

Terminal strips 23 and 24 (Fig. 3) are mounted on the back wall of the cabinet, and a locating pin 25 is associated with terminal strip 23. This locating pin projects forwardly from the back wall of the cabinet. A terminal strip 34 (Figs. 5 and 6) is mounted on the shelf of the larger subunit, and a locating hole 40 in terminal strip 34 is so located that this hole engages locating pin 25 (Fig. 3) just before the front panel of the unit makes contact with the front of the cabinet. The registration of hole 40 with pin 25 causes terminal strip 34 (Fig. 5) to be accurately aligned in the cabinet to the right of terminal strip 23 (Fig. 3). The result is, therefore, the same as though terminal strips 23 and 34 were one continuous strip instead of two separate strips. Two separate strips, however, are provided because terminal strip 34 is removable from the cabinet as a part of the larger subunit, whereas terminal strip 23 is fixedly mounted on the back wall of the cabinet.

Two terminal strips 61 and 62 (Fig. 9) are mounted on the top surface of the shelf of the smaller subunit. The terminals on strips 61 and 62 automatically line up with and slidably engage corresponding terminals of strips 34 (Fig. 5) and 23 (Fig. 3) as the shelf of the smaller unit approaches the rear wall of the cabinet. Electrical connections are thus established between terminals of the cabinet proper and terminals of the smaller unit, and also between terminals of the smaller unit and terminals of the larger unit.

The shelf of the smaller subunit is also fitted with another terminal strip 63 (Fig. 8) mounted along the lower rear edge. No top view of this strip is disclosed but it is similar to strips 61 and 62 (Fig. 9) except that it is one continuous strip across the shelf. The terminals of this strip automatically line up with and slidably engage the corresponding terminals of strip 24 (Fig. 3) in a manner similar to that described in the preceding paragraphs for strips 61 and 62.

A right-hand end view of the cabinet assembly is shown in Fig. 2. Holes 9 along the upper and lower edges provide ventilation to the interior, thus permitting the escape of heat generated by electronic tubes or other electrical units which may be mounted within the cabinet.

Wiring access to the interior of the cabinet is accomplished through bushings mounted on both end panels of the cabinet. The bushings 8 illustrated in Figs. 1 and 3 are of the watertight type but any standard type of bushing may be employed. The bushings are located close to the rear wall of the cabinet (Fig. 2) as the incoming wiring is connected to the terminals mounted on the inside surface of the rear wall.

Having disclosed the general principles of the invention in the preceding paragraphs, a detailed description will now be given.

Fig. 1 shows the front view of the complete assembly consisting of cabinet 1, upper front panel 2 and lower front panel 3. Front panel 2 has two members extending downward to the bottom edge of the cabinet at either side as indicated in Fig. 5 and is fastened to the cabinet by means of screws 4 (Fig. 1). Front panel 3 overlaps the right and left lower members of panel 2 and also the lower edge of the upper portion of panel 2, as shown in Fig. 1. Panel 3 is fastened to the lower edge of cabinet 1 by means of screws 5, and to front panel 2 by screws 6. Finger holes 7 in panel 3 provide facilities for withdrawing panel 3 after screws 5 and 6 have been removed. Panel 2 is withdrawn by grasping its lower edge after panel 3 has been removed.

Cabinet 1 consists of sheet metal back, top, bottom, left and right end members formed and fastened together to make an open-front box as shown in Fig. 3. Angle members 11, 12, 13, 14, 15 and 38 (Figs. 3 and 4) are attached to this box along the front edges by riveting or welding. These angles, in addition to stiffening the cabinet, provide facilities through tapped holes 16 and 17 for fastening front panels 2 and 3 to the cabinet by means of screws 4 and 5 respectively (Fig. 1). Holes 18 (Fig. 3) provide facilities for securely fastening cabinet 1 to a wall or vertical support.

Referring now to Fig. 3, fixture 19, consisting of back 20 and end members 21 and 22 formed at right angles to back 20, is riveted or welded to the back wall of the cabinet. To back wall 20 of fixture 19, terminal strips 23 and 24 are attached by means of screws for terminating wiring. Locating pin 25 is permanently fastened to the back wall. Horizontal channels 26 and 27 are permanently attached to end members 21 and 22 respectively of fixture 19, and in a like manner horizontal channels 28 and 29 are fastened to the end walls of the cabinet proper.

Front panel 2 is fitted with a shelf permanently attached and extending horizontally to the rear, as shown in Figs. 5 and 6. This shelf is made of sheet metal formed to have top surface 30, rear flange 31 and end panels 32 and 33. Instrumentalities may be mounted on the rear surface of panel 2 above the shelf and on the top surface 30 of the shelf in a very compact form and occupying the least possible overall space. Wiring from the instrumentalities for connections to points not on panel 2 or the shelf is terminated on a terminal strip 34 mounted on a small panel 35 attached to rear flange 31 of the shelf (Fig. 6).

Two rollers 36 are attached to each of end panels 32 and 33 of the shelf, as shown in Figs. 6 and 7, by means of rivets 37 which hold the rollers securely in place and yet permit the rollers to turn freely. The assembly of panel 2 and the shelf with instrumentalities mounted thereon is placed in the cabinet by causing rollers 36 (Figs. 6 and 7) to slip into horizontal channels 28 and 29 (Fig. 3) of the cabinet and pushing panel 2 inwardly until panel 2 makes contact with angles 11, 12, 13, 14, 15 and 38 of the cabinet. Channels 28 and 29 permit rollers 36 to ride freely therein but restrict the upward and downward movement of panel 2 shelf in the cabinet. When panel 2 is seated against the front angles of the cabinet, screws 4 (Fig. 1) engaging tapped holes 16 (Fig. 3) through clearance holes 39 (Fig. 5) are tightened to fasten panel 2 securely in place. Rollers 36 on end panels 32 and 33 resting in channels 28 and 29 of the cabinet adequately support panel 2 shelf and, consequently, the assembly of shelf and instrumentalities mounted thereon its capable of withstanding vibrations and severe shocks without dislodgement.

Referring particularly to Fig. 5, terminal strip 34 has a member extending outwardly to the left, said member having a vertically elongated hole 40. When rollers 36 are inserted into channels 28 and 29 and panel 2 is pushed inwardly until it contacts the front angles of the cabinet, elongated hole 40 registers with locating pin 25 (Figs. 3 and 4), and terminal strip 34 (Fig. 5) is thus automatically brought into perfect alignment with terminal strip 23 (Fig. 3).

Fig. 7 is a top view of the shelf attached to panel 2 showing a typical equipment of instrumentalities mounted on the rear surface of panel 2 and on top surface 30 of the shelf. Fig. 6 shows a right-hand end view of the instrumentality layout of Fig. 7. It should be understood at this time that the layout shown in Fig. 7 is typical only and that any desired arrangement or equipment of instrumentalities may be employed.

Referring now to Fig. 7, items 41, 42 and 43 are transformers, item 44 is a small electric motor of the synchronous type, items 45, 46 and 47 are electronic tubes, and items 48 and 49 are small condensers. All of these items except 47, 48 and 49 are also identified in Fig. 6 and, in addition, there are condensers 50 and 51 shown mounted on the rear of panel 2 underneath the motor 44.

The electronic tubes 45, 46 and 47 are locked in their respective sockets by means of spring clips 52 (Figs. 6 and 7) which prevent the tubes from being accidently disconnected from the sockets by shocks or otherwise. Consequently, the assembly shown in Figs. 6 and 7 may be placed upside down on a desk or table without the possibility of accidentally dislodging the tubes. Clip 52 is described in copending application 556,706 dated October 2, 1944, to which reference may be had for a detailed explanation.

The complete assembly shown in Fig. 6 is protected against possible damage when withdrawn from the cabinet and placed temporarily on the top of a desk or table. Four studs 10 attached to the front surface of panel 2 (Figs. 5 and 6) protect the front of panel 2 when the assembly is placed face down on a horizontal surface. Vertical member 35 of the shelf (Fig. 6) protects terminal strip 34, and the rear flange 31 of the shelf protects the instrumentalities mounted on the shelf when the assembly is placed face up on a desk or table. Vertical post 53 mounted on surface 30 of the shelf adjacent to rear flange 31 (Figs. 6 and 7) provides protection in combination with the top edge of panel 2 when the assembly is placed upside down on the desk or table.

Front panel 3 is also fitted with a shelf permanently attached and extending horizontally to the rear, as shown in Figs. 8 and 9. This shelf is made of sheet metal formed to have bottom surface 54, rear flange 55 and end panels 56 and 57. Two fuse blocks 58 and 59 are mounted on the shelf, as shown in Figs. 8 and 9, end panel 56 being shown partly cut away to reveal the fuse block mounting. It is, of course, possible to mount other instrumentalities on the shelf, either in combination with the fuse blocks or to displace the fuse blocks entirely, according to circumstances or needs. Each fuse block accommodates three fuses 60 although in this instance also the number of fuse clips may be varied to suit requirements. The fuse clips are wired to terminal strips 61 and 62 attached to rear flange 55 (Fig. 9). These two terminal strips are equipped with more terminals than the wiring from the fuse clips require, but the maximum number of terminals are included to demonstrate the terminating possibilities of the terminals strips in case other instrumentalities are mounted on the shelf.

Referring now to Fig. 8, terminal strips 61 and 62 are attached to rear flange 55 near its upper edge. The number of terminals may, therefore, be doubled by attached a second row of terminals 63 to rear flange 55 near the lower edge of the flange.

Two rollers 65 are attached to each of end panels 56 and 57 (Figs. 8 and 9) by means of rivets 66 which hold the rollers securely in place and yet permit the rollers to turn freely. After the assembly of panel 2 and its associated shelf has been placed in the cabinet and fastened in place by screws 4 (Fig. 1), the assembly of panel 3 and its shelf is placed in the cabinet by causing rollers 65 (Figs. 8 and 9) to slip into horizontal channels 26 and 27 (Fig. 3) of the cabinet and pushing panel 3 inwardly until panel 3 makes contact with the lower part of panel 2 (Fig. 1). As panel 3 comes to rest against panel 2, the terminals of strips 61, 62 and 63 on the shelf attached to panel 3 (Figs. 8 and 9) automatically engage corresponding terminals of strips 34 (Fig. 5), 23 and 24 (Fig. 3), thus completing electrical connections between the shelves of panels 2 and 3 and the wiring connected to terminals mounted on the back wall of the cabinet.

The terminals shown in Figs. 3, 5, 8 and 9 are of the male and female, sliding-contact, spring-jack type. However, any other well-known type of split connector may be used, such as sleeves and pins, and the like. Referring particularly to Figs. 3 and 5, strips 23, 24 and 34 are fitted with male jacks assembled in pairs. Thus, strip 34 (Fig. 5) has seven pairs of jacks or a total of fourteen terminals. Similarly, strip 23 (Fig. 3) has nine pairs or a total of eighteen terminals, and strip 24 has sixteen pairs or a total of thirty-two terminals. The general shape of each terminal is indicated in the end view of strip 23 in Fig. 4, the horizontal member 69 of each terminal constituting the sliding contact portion, and the vertical member 70 terminating in an ear to which a wiring conductor may be attached.

Referring now to Fig. 9, strip 61 is fitted with seven pairs of female jacks or a total of fourteen terminals which register with the corresponding fourteen terminals of strip 34 (Fig. 5) when panel 3 rests against panel 2 (Fig. 1). Similarly, strip 62 (Fig. 9) has nine pairs or a total of eighteen terminals registering with the corresponding eighteen terminals of strip 23 (Fig. 3). Strip 63 which is visible only in Fig. 8 has 16 pairs or a total of thirty-two terminals registering with the corresponding thirty-two terminals of strip 24 (Fig. 3). The general shape of each female terminal is indicated in the end view of strip 61 in Fig. 8, the upper horizontal member 71 constituting the sliding contact portion, and the lower horizontal member 72 terminating in an ear to which a wiring conductor may be attached. The manner of meshing one pair each of male and female jacks is shown in Fig. 10.

Members 69 and 70 are associated with the male jacks, and 71 and 72 with the female jacks. Insulation between members is indicated by 73.

Fig. 10 also shows a simple circuit in diagrammatic form from a source of electric power through the set of jacks to a pair of power fuses 60, for the purpose of illustrating that the fuses mounted on the smaller subunit are electrically dead when the subunit is withdrawn from the cabinet.

Screws 5 and 6 (Fig. 1) engaging tapped holes 17 (Fig. 3) and 68 (Fig. 5) respectively are tightened to fasten panel 3 securely in place. Rollers 65 on end panels 56 and 57 (Fig. 9) resting in channels 26 and 27 (Fig. 3) adequately support panel 3 shelf. Channels 26 and 27, while permitting rollers 65 to ride freely therein, restrict the vertical and horizontal movement of panel 3 shelf in the cabinet. The shelf is, therefore, capable of withstanding vibrations and severe shocks without dislodgement or the interrupting of electrical connections between the terminals of the shelf and the terminals of the cabinet.

The finger holes 7 (Fig. 1) for withdrawing panel 3 are protected on the rear of panel 3 by partition 64 (Figs. 8 and 9) which prevents accidental contact of the fingers with live terminals of instrumentalities mounted on the shelf.

A cable clamp 67 (Figs. 8 and 9) is attached to the rear of panel 3 for anchoring an incoming cable from another cabinet requiring, for example, connections to terminals of the strips mounted on rear flange 55 of panel 3 shelf. When such a cable is used, a cutout (not shown) in the bottom panel of the cabinet clears the cable when panel 3 is in place against panel 2.

When panel 3 is removed from the cabinet, the electrical connections between the terminals on panel 3 shelf and the terminals in the cabinet and on panel 2 shelf are naturally broken. Consequently, fuses on panel 3 shelf may be replaced without danger as the fuse clips of blocks 58 and 59 (Fig. 9) are dead under this condition.

Since the electrical connections between panels 2 and 3 are complete only when panels 2 and 3 are mounted in the cabinet, it would ordinarily be impossible to observe the operation of the instrumentalities associated with panel 2 without the generally unsatisfactory use of temporary wires tediously run between the terminals of panels 2 and 3 and the terminals in the cabinet. However, efficient means are provided for electrically connecting up panel 2 when it is placed on a desk or table top for operating inspection. The means consists of two special jack assemblies connected together with a suitable length of cord, as described in the following paragraphs.

Fig. 11 shows a side view of the panel 3 end of the special connecting cord. The panel 3 end consists of a formed bracket 74 to which is attached terminal strip 75. Seven pairs of male jacks are included in strip 75 to register with the seven pairs of female jacks on strip 61 of panel 3 shelf (Fig. 8). A clamp 76 attached to the top member of bracket 74 fastens connecting cord 77 securely to the bracket assembly, and the wire conductors of cable 77 are attached to the terminals of strip 75. At the center portion of bracket 74 are located screws 79, and at the bottom of the bracket are small offset prong extensions 78. There are two prongs 78 on the bracket, likewise two screws 79.

Prongs 78 are inserted in corresponding slots 80 shown in dotted lines at the lower part of member 81 (Fig. 8) and then the bracket assembly is pressed towards back plate 55 of the shelf, the prongs 78 acting as hinges. As the bracket assembly reaches the vertical position, the jacks of strip 75 (Fig. 11) engage the jacks of strip 61 (Fig. 8), and screws 79 engaging tapped holes in bushings 82 (Figs. 8 and 9) are tightened to secure the bracket assembly in place. The shelf of panel 3 is then placed in the cabinet, in the manner previously explained, and panel 3 pushed towards the cabinet until strips 62 and 63 of panel 3 shelf engage strips 23 and 24 in the cabinet. Panel 3 is now again electrically connected.

The panel 2 end of the special connecting cable also consists of a formed bracket to which is attached a terminal strip equipped with seven pairs of female jacks for registering with the seven pairs of male jacks on strip 34 (Fig. 5) of panel 2 shelf. This bracket assembly is mounted and fastened to member 35 (Fig. 6) in a manner similar to that described in the preceding paragraph for panel 3 bracket assembly, in this instance the slots (not shown) being in plate 30 (Fig. 6) and the bracket assembly being fastened to the left-hand side of member 35. Panel 2 is now electrically connected to panel 3 through the medium of the special connecting cord, and operating tests on panel 2 may be observed. In addition to panel 2 bracket assembly being fitted with female jacks instead of male jacks, its offset prongs are on different centers from the offset prongs 78 shown in Fig. 11. Hence, it is impossible to place the wrong bracket assembly on the terminal strips of either panels 2 or 3.

From the foregoing description and associated drawings, it will be readily seen that an exceedingly compact and entirely enclosed mounting unit has been devised, capable of withstanding severe vibrations and shocks, offering complete mechanical protection to instrumentalities mounted therein and, by means of the automatic disengagement of the terminal strips, making it a simple matter to remove the panel assemblies for inspection, test or repair.

It should be understood that while one embodiment of the invention is disclosed and described in the preceding specification, the invention is not limited to the particular form or application shown, but is entitled to the equivalents thereof within the scope of the appended claims.

What is claimed is:

1. In a mounting arrangement, the combination of a cabinet, a unitary assembly holding electrical instrumentalities wired to terminals mounted on said assembly, said assembly removably disposed in said cabinet thereby to position the terminals of said assembly in said cabinet, a second unitary assembly holding other electrical instrumentalities wired to terminals mounted on said second assembly, said second assembly removably disposed in said cabinet thereby to cause the terminals of said second assembly to connect with the positioned terminals of said first disposed assembly and thus interconnect the instrumentalities of said two disposed assemblies, said cabinet and said disposed assemblies completely protecting said instrumentalities and connected terminals from accidental contact or unauthorized tampering, the withdrawal of one of said disposed assemblies from said cabinet automatically breaking said connections between the two assemblies before any of said instrumentalities or terminals become exposed.

2. In combination, a cabinet, terminals mounted within said cabinet, a subunit having terminals mounted thereon, said subunit removably disposed in said cabinet thereby to cause the terminals of said subunit to be positioned in said cabinet, another subunit having terminals mounted thereon, said other subunit removably disposed in said cabinet thereby to cause the terminals of said other subunit to make electrical connections with said terminals mounted within said cabinet and with said positioned terminals of said first disposed subunit, said cabinet and said disposed subunits forming a housing for protecting said connected terminals from accidental contact or unauthorized tampering.

3. In combination, a cabinet, terminals fixedly mounted in said cabinet, a locating projection in said cabinet, a subunit having terminals, said subunit removably disposed in said cabinet, an opening in said disposed subunit registering with said projection in said cabinet thereby causing the terminals of said disposed subunit to be accurately aligned in said cabinet with the terminals fixedly mounted in said cabinet, a second subunit having terminals equal in number to the number of terminals fixedly mounted in said cabinet and the aligned terminals of said first disposed subunit, the arrangement of said terminals of said second subunit corresponding to the arrangement of the terminals fixedly mounted in said cabinet and said terminals aligned in said cabinet, said second subunit removably disposed in said cabinet thereby to cause some of its terminals to connect with the terminals fixedly mounted in said cabinet and other of its terminals to connect with said aligned terminals of said first disposed subunit, said cabinet and said disposed subunits forming a housing to protect said connected terminals from accidental contact, the partial withdrawal of said second disposed subunit from said cabinet disconnecting the terminals of said second disposed subunit from the terminals fixedly mounted in said cabinet and from the aligned terminals of said first disposed subunit while the terminals of said partially withdrawn subunit are still protected from possible outside contact.

4. The combination of a support for electrical equipment, said support having a jack terminating electrical connections, a removable unit having electrical equipment and a jack interconnected together, means for accurately positioning said last jack on said support effective when said unit is mounted on said support, a second removable unit having other electrical equipment and two plugs interconnected together, and means for causing one of said plugs to connect with said first mentioned jack and the other plug to connect with said jack positioned on said support effective when said second unit is mounted on said support after said first unit has been mounted on said support, the disengagement of said plugs and jacks controlled by the removal of said second unit.

THEODORE C. RIEBE.

REFERENCES CITED

The following references are of record in the file of this patent:

UNITED STATES PATENTS

| Number | Name | Date |
|---|---|---|
| 1,492,309 | Ogden | Apr. 29, 1924 |
| 1,690,118 | Julyan | Nov. 6, 1928 |
| 1,732,346 | Waller | Oct. 22, 1929 |
| 1,769,536 | Oak | July 1, 1930 |
| 1,946,889 | Wessel | Feb. 13, 1934 |
| 2,077,160 | Wilson | Apr. 13, 1937 |
| 2,151,756 | Fletcher | Mar. 28, 1939 |